May 30, 1967　　　B. N. GRACHEV　　　3,321,963
INDUCTION TYPE ELECTRIC DYNAMOMETER
Filed Aug. 18, 1964
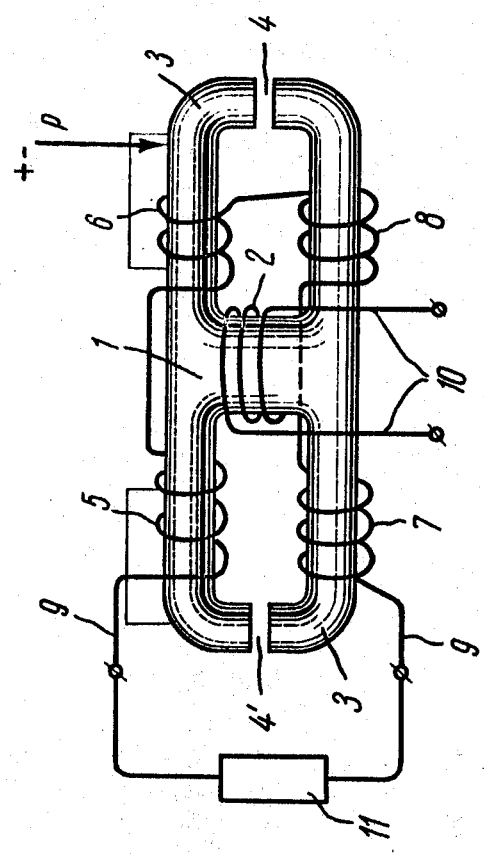

3,321,963
INDUCTION TYPE ELECTRIC DYNAMOMETER
Boris Nikandrovich Grachev, Kaliningrad, Moscow Oblast, U.S.S.R., assignor to Nauchno-Issledovatelsky i Konstruktorsky Institute Ispytateljnykh mashin, priborov isredstv izmerenia mass, Moscow, U.S.S.R.
Filed Aug. 18, 1964, Ser. No. 390,368
1 Claim. (Cl. 73—141)

The present invention relates to electric dynamometers of the induction type designed for measuring force and moment.

There are known dynamometers wherein apart from a force responsive structure, electromagnetic displacement pickups are used as individual units. The disadvantage of the aforesaid dynamometers are that they are complicated in design and feature unsufficient measuring accuracy. Besides, said dynamometers cannot be precisely calibrated when unloaded.

There are also known dynamometers of the induction type whose force responsive resilient structure is at the same time a magnetic core, the reluctance of said core, when force or moment is applied thereto, being varied due to the change in the magnetic properties of the material of the resilient structure proper. However, dynamometers of the latter type yield inaccurate readings under the conditions of ambient temperature variations.

It is an object of the present invention to provide an induction type electric dynamometer of simple design which is free of the above disadvantages, and furnishes reliable operation and suitable metrological characteristics irrespective of the change in ambient temperature.

According to the invention the force responsive resilient structure is a magnetic core carrying field and measuring windings, said core being of H-shape and having air gaps at its ends through which a magnetic flux induced by the field winding passes, the measuring windings being connected in such a way that, with the dynamometer unloaded, the total E.M.F. induced therein is equal to zero.

When force or moment of any sign is applied to the force responsive resilient structure, i.e. magnetic core, said member deforms and, consequently, one of the air gaps increases while the other decreases. As a result, the magnetic core reluctance changes, the magnetic flux is redistributed, and a voltage proportional to the force applied is induced at the output of the measuring windings.

This voltage can be measured, for example, by a voltmeter graduated in terms of load being measured.

The accompanying drawing shows a schematic diagram of the dynamometer constructed according to the invention. A force responsive resilient structure 1 carries a field winding 2 inducing a magnetic flux passing across poles 3 through air gaps 4 and 4'. Positioned on poles 3 are series-connected measuring windings 5, 6, 7 and 8. Terminals 9 of the measuring windings are to be coupled to a measuring instrument 11 while terminals 10 of field winding 2, are to be connected to the power supply source.

When a force P is applied to the force responsive resilient structure 1, the latter is deformed thereby decreasing gap 4 and increasing gap 4'. When the force is applied in the opposite direction, the air gap 4 increases and the gap 4' decreases.

While the present invention is described in connection with a preferred embodiment, it is to be understood that the invention can have various changes and modifications, which will be apparent to those skilled in the art, and which will fall within the scope of the invention as defined by the attached claim.

What is claimed is:

An induction type electric dynamometer comprising a one-piece body of magnetizable material, said body being formed to define a magnetic circuit with opposite poles defining a pair of air gaps, said body being resiliently deformable by the application of external force thereto to vary the relative size of said gaps and thereby the reluctance of the magnetic circuit, means sensitive to the variation of reluctance of the magnetic circuit to indicate the magnitude of external force applied to said body, said body being of H-shape with a pair of legs and a central member between said legs, said pair of legs having remote ends defining said pairs of gaps, and a magnetizing field winding on said central member for inducing magnetic flux through said body and across said air gaps, said means for indicating the magnitude of external force which is applied to said body comprising measuring windings on the legs in opposed series connection adapted for being coupled to a measuring instrument.

References Cited
UNITED STATES PATENTS

| | | | |
|---|---|---|---|
| 2,470,244 | 5/1949 | Fryklund | 336—135 XR |
| 2,623,386 | 12/1952 | Baker | 73—141 XR |
| 2,683,989 | 7/1954 | Clark | 73—398 |
| 3,168,830 | 2/1965 | Chass | 73—398 |

RICHARD C. QUEISSER, *Primary Examiner.*

C. A. RUEHL, *Assistant Examiner.*